United States Patent
Jackson (10) Patent No.: US 8,010,470 B2
(45) Date of Patent: Aug. 30, 2011

(54) METHOD OF AND APPARATUS FOR AUTOMATED BEHAVIOR PREDICTION

(75) Inventor: Gary M. Jackson, Gambrills, MD (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 12/625,087

(22) Filed: Nov. 24, 2009

(65) Prior Publication Data

US 2010/0161528 A1     Jun. 24, 2010

Related U.S. Application Data

(62) Division of application No. 11/404,896, filed on Apr. 17, 2006, now Pat. No. 7,653,605.

(60) Provisional application No. 60/671,475, filed on Apr. 15, 2005.

(51) Int. Cl.
    *G06F 15/18*         (2006.01)

(52) U.S. Cl. .................. 706/20; 706/21; 706/45

(58) Field of Classification Search ............. 706/20, 706/21, 45

See application file for complete search history.

(56) References Cited

U.S. PATENT DOCUMENTS

2004/0010481 A1 *    1/2004    Mani et al. ............. 706/21

OTHER PUBLICATIONS

Leul Woldu Asegehgn ("The Application of Data Mining in Crime Prevention: The Case of Oromia Police Commission" Jul. 2003).*
Mladeni et al ("Feature selection on hierarchy of web documents" Apr. 2003).*
Mena, Jesus, "Pre-Crime Data Mining," Dec. 2002.
Gurney, Kevin, "An Introduction to Neural Networks," 10 pp., 1999.
Jackson, Gary M., and Patterson, Roger L., "Single Case Behavioral Treatment," in *Overcoming Deficits of Aging: A Behavioral Approach,* Roger L. Patterson, Larry W. Dupree, David A. Eberly, Gary M. Jackson, Michael J. O'Sullivan, Louis A. Penner, and Carla Dee Kelly, Plenum Press, New York, Copyright 1982, 26 pp. (includes Cover, Copyright Page, Table of Contents, and pp. 89-110).

* cited by examiner

*Primary Examiner* — Jeffrey A Gaffin
*Assistant Examiner* — Lut Wong
(74) *Attorney, Agent, or Firm* — King & Spalding LLP (57) ABSTRACT

A computer-implemented method of behavior prediction includes selecting behavior examples having corresponding antecedent candidates, identifying source text descriptions describing the behavior examples, automatically extracting predictors as common themes across all statements and all behavior examples with a language-independent theme extraction process, flagging each behavior example to indicate a presence or absence of the corresponding extracted antecedents in each of the source text descriptions and creating a data array consisting of antecedent columns and behavior example rows, submitting the data array to a pattern classifier to extract patterns among the antecedent candidates and outcomes by training and validating the pattern classifier and predicting a new occurrence of a target behavior by entering a current state of the antecedents to the trained pattern classifier.

10 Claims, 5 Drawing Sheets

METHOD OF AND APPARATUS FOR AUTOMATED BEHAVIOR PREDICTION

CROSS-REFERENCE TO RELATED APPLICATION

This application is a divisional of U.S. application Ser. No. 11/404,896, filed on Apr. 17, 2006, now U.S. Pat. No. 7,653,605, which claims the benefit of U.S. Provisional Application No. 60/671,475 filed on Apr. 15, 2005, both of which are incorporated herein by reference.

STATEMENT OF GOVERNMENT INTEREST

This invention was made with Government support under Contract No. N00173-04-C-2055 awarded by the Department of Navy. The Government has certain rights in the invention.

BACKGROUND OF THE INVENTION

Mankind has attempted to predict human behavior for the duration of recorded history. Early attempts included fortune telling, witchcraft, astrology, "psychic ability", and "willing" the future to happen. These pseudoscience attempts have been replaced with mathematics and computer-generated models. For example, there has been fair to moderate success in predicting weather, economic factors, political elections, etc., with mathematical models ranging from simple to computer-intensive. However, typical mathematical modeling used for dynamic weather prediction, hurricane prediction, and economic status has not demonstrated accurate and reliable prediction of dynamic human behavior. Although there has been success in predicting effects of some types of behavior, such as predicting college GPA from high-school GPA or from SAT scores, such prediction is based substantially on the simple fact that very smart individuals who have a high GPA in high school or who score well on tests exhibit the same degree of intelligence in the future and score in similar ways. This is not surprising or difficult to predict. If we select dynamic human behavior such as what action a chief executive officer of a company may take, what a specific terrorist group will do next, how a leader may determine actions of a country, where a fugitive may hide, or where a serial murderer may strike next, the task of behavioral prediction is exceedingly complex.

In order to achieve an accurate prediction of complex human behavior, identifying the environmental influences that the individual, group, business, or country responds to is necessary. Once these indicators are identified, they may be subjected to pattern classification methods to identify the complex patterns underlying the occurrence of target behaviors in response to indicators. Using this process, prediction of future behavior can occur if the current presence and absence of the indicators are processed through a trained pattern classifier. To adequately predict human behavior in an automated manner, it is necessary to identify and separate actual predictors of target behaviors from noise variables that appear to be predictors but that generate spurious results. However, conventional behavior prediction models involve significant manual processing and are very time consuming and subject to errors. What is needed is an accurate behavior prediction process that is able to select predictors from noise variables that appear to be predictors but that generate spurious results, and that is capable of identifying patterns that exist among indicators and subsequent behaviors to be predicted in such a manner that accurate prediction is possible.

SUMMARY OF THE INVENTION

In accordance with an aspect of the invention that relies on construction of a custom database dedicated to a desired prediction task, a computer-implemented method of behavior prediction includes selecting behavior examples in text with all antecedent candidates occurring prior to each selected behavior example; creating a database that stores each behavior example with corresponding antecedent candidates as distinct records; extracting themes by correlating high-frequency occurrences embedded in the antecedent candidates, resulting in common theme predictors (antecedents); eliminating spurious antecedent candidates from the common theme predictors; automatically scoring a presence or absence of each of the extracted themes for each behavior example to obtain a presence-absence vector that represents the presence or absence of all of the antecedent candidates for each behavior example; generating a data array having columns representing the extracted themes and rows representing each behavior example across all of the behavior examples; inputting the data array to a BPN (back-propagation neural network) pattern classifier, or other form of statistical pattern classifier that outputs a predicted behavior for each behavior example in response to patterns extracted from the data array; training and validating the BPN pattern classifier based on an accuracy of the predicted behavior on the historical behavior examples until a minimum training error is achieved, repeating training across different BPNs with altered number of antecedents and different internal configuration until the BPN with optimal accuracy predicting historical behavior examples is achieved, and then obtaining a prediction by submitting a vector indicating the presence or absence of the antecedents for that given day to the optimal BPN as input-the prediction is the immediate output.

In accordance with another aspect of the invention relying only on text descriptions of behavior examples with no database, a behavior predictor includes a formatter that splits source text descriptions describing behavior examples and associated antecedent candidates into text segments and tags the text segments with unique identifiers identifying the source text descriptions from which the text segments were obtained; an automated antecedent theme extractor that processes the text segments and identifies common themes (antecedents) across all the text segments and generates an antecedent and outcome data array containing rows corresponding to the text segments, columns corresponding to the antecedents and containing data indicating whether or not the antecedents are present in the text segments, and columns corresponding to outcomes and containing data indicating whether or not the outcomes are present in the text segments; and a pattern classifier that receives the antecedent and outcome data array as a training input and automatically validates various configuration of the BPN pattern classifier with different antecedents until an optimal accuracy BPN is achieved, and receiving a prediction by submitting a current antecedent presence-absence vector indicating a presence or absence of the antecedents for a given day to the optimal BPN.

In accordance with another aspect of the invention relying on an already established database, a computer-implemented method of behavior prediction includes downloading from a database of behavior examples a list of antecedent candidates associated with the behavior examples (such as date, location, time, events, situations, etc.) with unique identifiers identifying the behavior examples; processing the list of antecedent candidates with the unique identifiers with an automated antecedent theme extractor that eliminates spurious and false antecedent candidates in the list to identify actual antecedents; generating an antecedent and outcome data array containing rows corresponding to the behavior examples, columns corresponding to the antecedents and containing data indicating whether or not the antecedents are present in the behavior examples, and columns corresponding to outcomes and containing data indicating whether or not the outcomes are present in the text segments; training and validating the BPN pattern classifier by processing the antecedent and outcome data array as training input resulting in extracted patterns existing among the pattern classifier input layer (antecedents) and outputs (desired behavior to be predicted), repeating training across different BPNs with altered number of antecedents and different internal configuration until the BPN with optimal accuracy predicting historical behavior examples is achieved, and then obtaining a prediction by submitting a vector indicating the presence or absence of the antecedents for that given day to the optimal BPN as input-the prediction is the immediate output.

Additional aspects and/or advantages of the invention will be set forth in part in the description that follows and, in part, will be obvious from the description, or may be learned by practice of the invention.

BRIEF DESCRIPTION OF THE DRAWINGS

These and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Reference will now be made in detail to embodiments of the invention, examples of which are shown in the accompanying drawings, wherein like reference numerals refer to like elements throughout. The embodiments are described below in order to explain the invention by referring to the figures.

Figure 1:
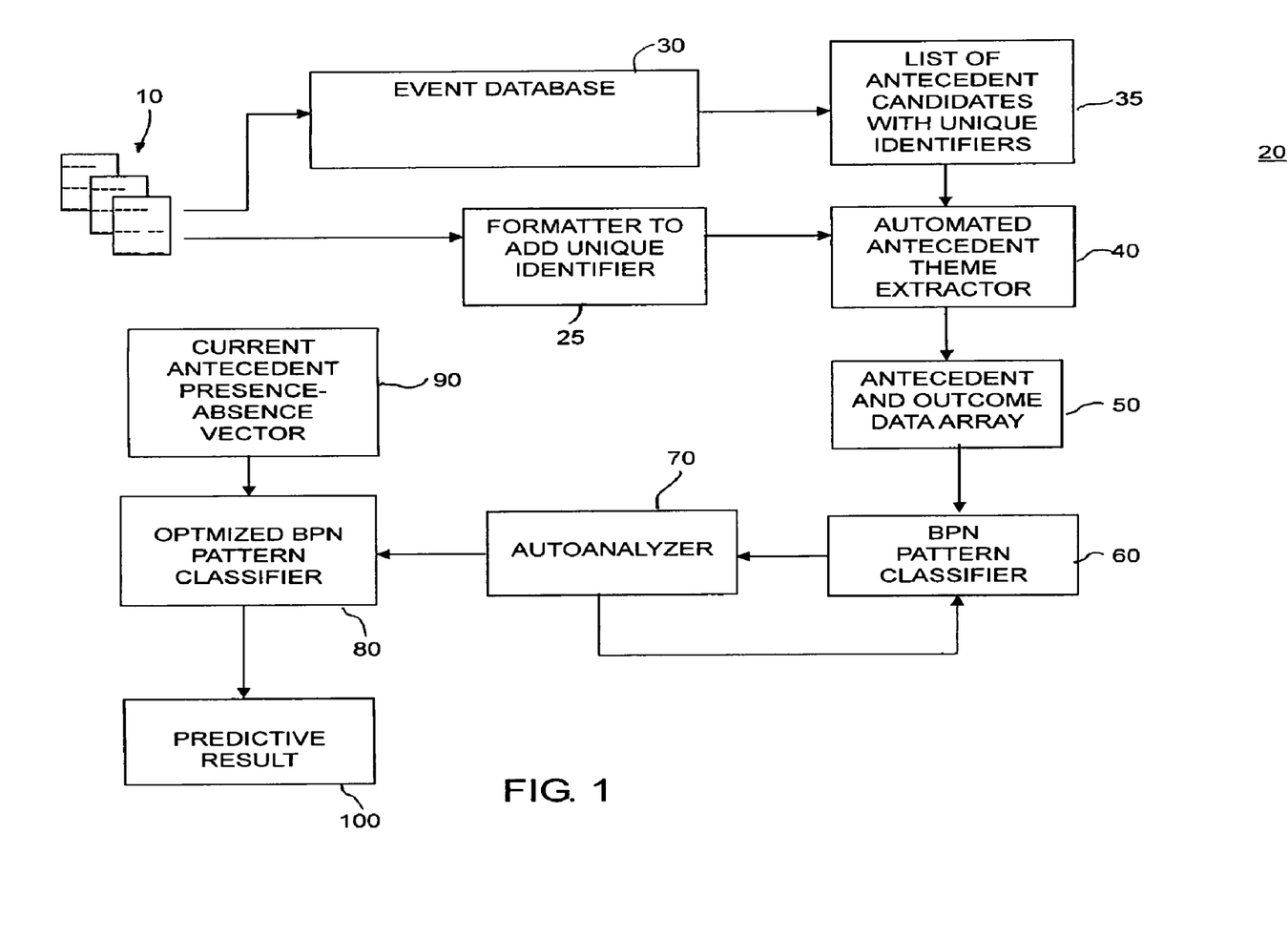
FIG. 1 is a block diagram of a behavior predictor according to an embodiment of the invention.

FIG. 1 shows a block diagram of a behavior predictor 20 according to an embodiment of the invention. Referring to FIG. 1, the behavior predictor 20 includes a formatter 25 to add a unique identifier to source text descriptions 10 of behavior examples, an event database 30 containing data extracted from the source text descriptions 10 from which a list 35 of antecedent candidates with unique identifiers is downloaded, an automated antecedent theme extractor 40 that creates an antecedent and outcome data array 50, a BPN (back-propagation neural network) pattern classifier 60, and an autoanalyzer 70 that trains and tests the BPN pattern classifier 60 and outputs an optimized BPN pattern classifier 80 after training and testing of the BPN pattern classifier 60 is completed. The optimized BPN pattern classifier 80 may be used to obtain a prediction of a target behavior to be predicted by entering into the optimized pattern classifier 80 a current antecedent presence-absence vector 90 representing a current state of antecedents selected for the optimized pattern classifier 80 to obtain a predictive result 100. The event database 30 may be a custom-made database created for a specific prediction task, or may be an already existing database containing data about a target behavior to be predicted. The behavior predictor 20 as shown in FIG. 1 may be implemented as a computer system including a plurality of computer programs executing the elements of the behavior predictor 20.

A list of behavior examples for an entity such as a person, a group, or an organization of any size is obtained by random selection or as a representative sample of desired target behaviors to predict. Source text descriptions 10 of the behavior examples may be compiled by several different methods. For example, news text article repositories such as REUTERS or NEXIS may be searched for articles about desired behavior examples. However, text in any form representing behaviors or specifics of entities, such as financial transactions or reports, may be included in the source text descriptions 10 of the sample examples. Data about the behavior examples that is desirable to include in the source text descriptions 10 include a date of a behavior example, a description of the behavior example, all logically related events and situations occurring as a result of the behavior example, and logically related precursor events and situations temporally associated with the behavior example and occurring prior to the behavior example.

A time window for the logically related precursor events and situations may be specified, ranging from daily to bi-weekly depending on the frequency of occurrence of the behavior examples. For example, if the behavior examples sampled occur frequently (e.g., on the average of every two days), it is desirable to collect precursor events and situations within that temporal time frame. Precursor events and situations occurring earlier than that would also relate to one or more earlier behavior examples, and therefore might not necessarily be predictive of the specific behavior example for which the precursor events and situations are being collected. If the behavior examples sampled occur at much longer intervals (on the average of monthly), it is desirable to collect precursor events and situations for up to two weeks preceding each behavior example. Precursor events and situations occurring more than two weeks before a behavior example are typically not very helpful in predicting future occurrences of that behavior example.

Electronic copies of all relevant source text descriptions 10, such as articles or text examples, describing the behavior examples are obtained and tagged to be associated and filed according to the behavior examples in separate records in the event database 30. One behavior example may be described by one or more related source text descriptions 10. If more than one source text description 10 describes a specific behavior example, then all such source text descriptions 10 are tagged to be associated and filed according to that specific behavior example. Alternatively, text can be compiled by day or event using that day or event as a unique identifier as a tag to indicate the difference between a specific behavior example and all other behavior examples. Such a compilation allows for the extraction of relevant precursor themes without a structured database.

The event database 30 may be implemented as a database on a server or other computer, and stores domain-specific demographic data about specific behavior examples, antecedents of the behavior examples (i.e., precursor events and situations preceding the occurrence of the behavior), and consequences (e.g., events and situations following the occurrence of the behavior) in corresponding fields. The fields of the event database 30 may be specified or changed by a user through entries in a graphical user interface (GUI) for accessing the event database 30. The event database 30 may be an already constructed database if it contains records describing behavior examples and associated precursor events and situations (e.g., date, time, location, associated events, associated situational variables, etc.), or may be a custom-made database designed for a specific content domain prediction task.

If the event database 30 is a custom-made database, it is constructed to incorporate features of a conventional behavior analysis form as described in G. M. Jackson and R. L. Patterson, "Single Case Behavioral Treatment," in Overcoming Deficits of Aging: A Behavioral Approach, R. L. Patterson, L. W. Dupree, D. A. Eberly, G. M. Jackson, M. J. O'Sullivan, L. A. Penner, and C. D. Kelly, New York: Plenum Press, 1982, the disclosure of which is incorporated herein by reference in its entirety. This now conventional behavior analysis form incorporates a description of the behaviors to be analyzed, precursor events and situations (i.e., antecedent candidates), and consequences of the behavior (i.e., consequence candidates), and contains both text fields and integer fields.

Text fields are used to describe behaviors to be predicted, antecedent candidates, and consequence candidates, as well as any desired additional example descriptors.

Antecedent candidates and consequence candidates may be manually subjected to a sorting process whereby all candidate statements are reordered by basic concepts embedded within the statements, wherein different themes that surface may include the same statement, given that different concepts are described by different wording within the same statement. Alternatively, an entire text corpus that is tagged by unique identifiers identifying specific behavior examples, whether obtained from the event database 30 or directly from source text descriptions 10, may be subjected to the automated extraction of themes described herein.

Integer fields are used to code the presence or absence of specific antecedents after theme extraction and coding, which will be described in more detail below. The presence or absence of specific antecedents is designated with a "1" for present or a "0" for absent. It is important to note that this process may be performed manually or in an automated manner as described herein.

Figure 2:
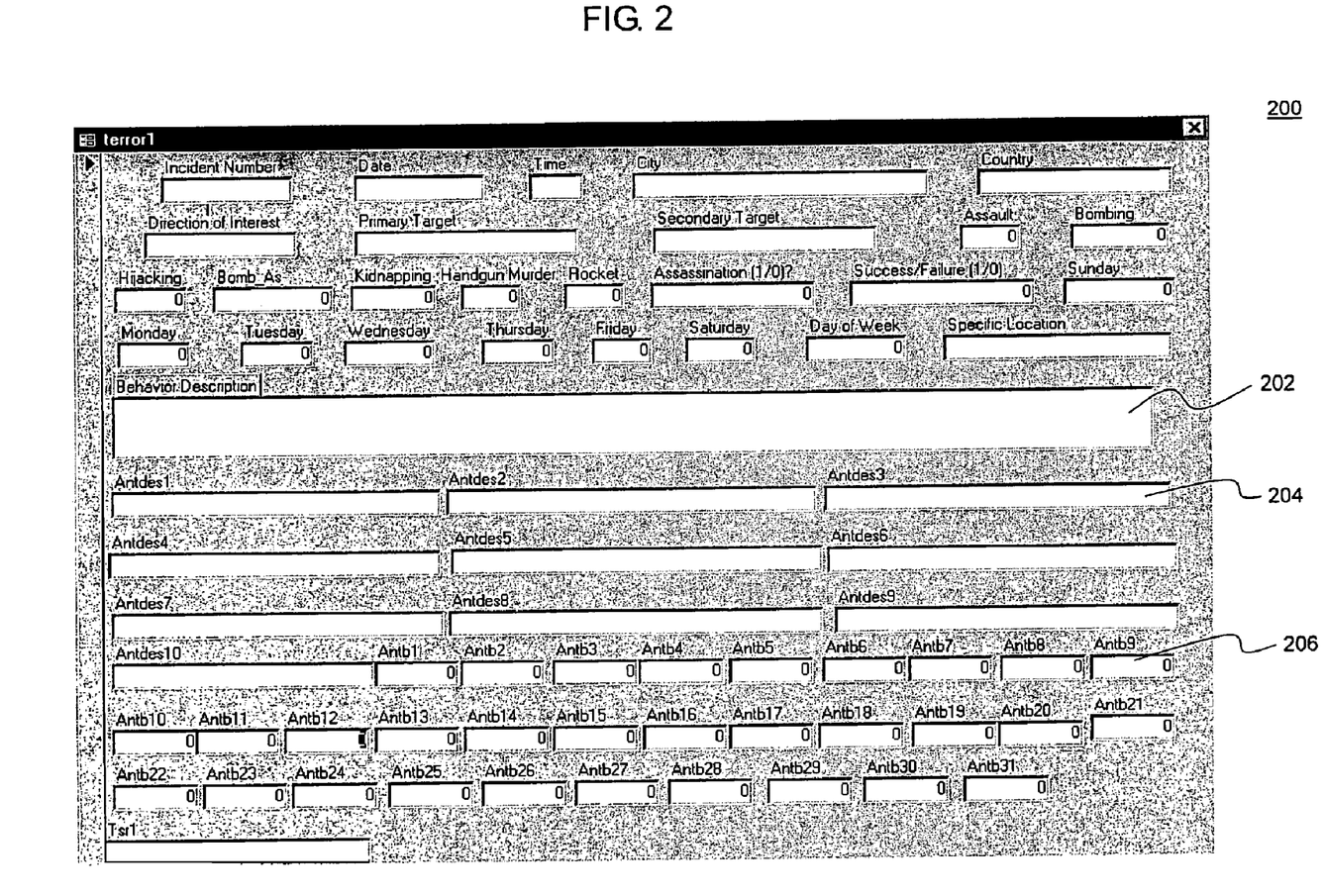
FIG. 2 shows a screenshot of an example of a data entry form for entering data into an event database of the behavior predictor shown in FIG. 1.

FIG. 2 shows a screenshot of an example of a data entry form 200 for manually entering data into the event database 30. Referring to FIG. 2, the data entry form 200 includes several types of content fields. An incident number field contains a unique identifier identifying a specific behavior example. A behavior description field 202 contains a description of the behavior in the specific behavior example. Antdes1, Antdes2, ... Antdesn fields 204 contain text descriptions of various antecedent candidates. Antb1, Antb2, ... Antbn fields 206 contain binary values indicating the presence ("1") or absence ("0") of each antecedent candidate. A download of all antecedent candidates (i.e., possible predictors) forms a corpus that will be reduced by theme extraction in the automated antecedent theme extractor 40 to obtain a much smaller set of frequently occurring themes that serve as actual antecedents or predictors.

In the past, appropriate data has been manually entered into the Antb1, Antb2, ... Antbn fields 206 when data has been manually entered into the event database 30. However, it is not necessary to do this in the automated process described herein because a list 35 of antecedent candidates with unique identifiers is automatically downloaded from the event database 30. Thus, if a specific antecedent candidate is present in a specific behavior example, that specific antecedent candidate will appear in the list 35 tagged with the unique identifier identifying that specific behavior example. This is the equivalent of manually entering a "1" into the Antbn field 206 corresponding to that specific antecedent candidate in the record for that specific behavior example in the event database 30. Conversely, if that specific antecedent candidate is not present in that specific behavior example, that specific antecedent candidate will not appear in the list 35 tagged with the unique identifier identifying that specific behavior example. This is the equivalent of manually entering a "0" into the Antbn field 206 corresponding to that specific antecedent candidate in the record for that specific behavior example in the event database 30.

The remaining fields of the data entry form 200 are filled in with information extracted by a user from the source text descriptions 10 of the behavior examples. This is done by text-based searching of the source text descriptions 10, extracting data about the behavior examples described in the source text descriptions 10 specific to each field in the event database 30, and entering the extracted data in the corresponding fields in the event database 30. It is understood that the types of articles and/or documents included in the source text descriptions 10 may be tailored and changed to match the subject matter to be predicted. For example, if it were desired to predict reactions of the oil industry to a certain possible event, the source text descriptions 10 would be tailored to include articles and/or documents describing various reactions to the event, with topical precursor and consequence events and situations associated with the descriptions of specific behavioral reaction of the oil industry.

The event database 30 is populated on an example-by-example basis with text from the source text descriptions 10 of the behavior examples. The date of a behavior example serves as a unique identifier of the behavior example, with multiple behavior examples occurring on a single date being designated in sequence as datea, dateb, etc. (not shown). However, any unique identifier may be used to designate a behavior example. Selected antecedent candidates stated as precursor events and situations associated with a behavior example are listed as separate statements in the event database 30. Once the event database 30 has been populated with all desired behavior examples and associated antecedent candidates, a list 35 of antecedent candidates with unique identifiers is downloaded from the event database 30 in the form of a table with two columns. The first column is the unique identifier of a behavior example, and the second column includes all statements in all database records in the event database 30 that are tagged with the unique identifier in the first column. For example, if a behavior example is designated with a unique identifier 042005 and that behavior example in the event database 30 includes five antecedent candidates as precursors, the downloaded list 35 would include five rows beginning with the unique identifier 042005, and each of these five rows would include one of the antecedent candidates included in the database record for that behavior example in the event database 30. The downloaded 35 is input to the automated antecedent theme extractor 40 for theme extraction.

Although a process of manually creating the event database 30 has been described above, the invention is not limited to use with such a manually created database 30. Instead, an automated process or program may be used to extract appropriate data from the source text descriptions 10 and populate the fields in the database 30.

Although a process of creating a new event database 30 has been described above, the invention is not limited to use with such a newly created event database 30. There are thousands of databases in existence that contain lists of behavior examples and antecedent candidates and consequence candidates associated with the behavior examples. A list 35 of antecedent candidates with unique identifiers may be downloaded from any such existing database and input to the automated antecedent theme extractor 40.

If the event database 30 is not to be used, but instead the source text descriptions 10 are input to the automated antecedent theme extractor 40 for theme extraction, the formatter 25 divides each of the source text descriptions 10 into text segments and adds a unique identifier identifying that source text description 10 to all of the text segments obtained from that source text description 10. Thus, all of the text segments obtained from a first one of the source text descriptions 10 will be identified by a first unique identifier identifying the first source text description 10, all of the text segments obtained from a second one of the source text descriptions 10 will be identified by a second unique identifier identifying the second source text description 10, and so forth. The text segments into which the formatter divides the source text descriptions 10 may be documents, pages, paragraphs, sentences, phrases, lines, or any other suitable text segments. The automated antecedent theme extractor 40 processes each text segment of the source text descriptions 10 separately.

The antecedent theme extractor 40 processes either the downloaded list 35 in the form of a table of unique identifiers and corresponding antecedent candidates, or the text segments of the source text descriptions 10 with the unique identifiers added by the formatter 25. The antecedent candidates or the text segments constitute a text corpus. It is assumed that many of the antecedent candidates or the text segments will fall out during the process of theme extraction for several reasons. First, if there is a spurious event or situation in one of the behavior examples, it will likely not occur again across the other behavior examples. It therefore would not survive the theme extraction process that is designed to find themes that repeat across all the antecedent candidates or the text segments. Second, low-frequency themes would drop out as well. Because theme extraction is based on identifying the most frequently occurring themes across all examples, only consistent themes will emerge. The process of eliminating spurious or low-frequency themes is described below.

The process of theme extraction occurs by cross-correlating all words contained in the text corpus constituted by the antecedent candidates or the text segments. The result is a list of word pairs with associated frequency of occurrence in the text corpus. Then, all word pairs are cross-correlated with all word pairs to result in "pair-pairs". The automated antecedent theme extractor 40 lists all antecedent candidates or text segments containing the first word pair under that word pair. Each such list of antecedent candidates or text statements is preceded by a listing of the pair-pairs. This represents a theme (an alternative term is antecedent). The first word pair designates the theme, and all antecedent candidates or text segments listed under that theme contain the first word pair. The second word pairs are listed with the first word pair to provide specificity beyond the first word pair. The antecedent candidates or text segments listed do not need to follow grammatical rules.

As an example, a first word pair describing a theme could be "dog-ran". All antecedent candidates or text segments containing the words "dog" and "ran" are placed under that theme. However, each instance of the theme will have second word pairs listed with the first word pair that describes the theme. The following example describes this formatting:

Theme #22
dog-ran, ball-red
dog-ran, ball-bouncing
dog-ran, threw-ball
042005 The dog ran after the bouncing ball.
041905 The boy and the dog ran down the street after the boy threw the ball.
020104 The ball was bouncing as the dog ran after the red, bouncing object.

The first word pair describes a theme of a dog running The second word pair provides more specificity to the overall theme and aids in characterizing the construct. For example, summarizing the pair-pairs, this theme could be characterized as "The dog ran after a thrown, red bouncing ball." Each antecedent candidate or text segment listed under the theme is tagged with the unique identifier identifying the record in which the antecedent candidate or text segment appears, indicating that the three antecedent candidates or text segments, although similar, were listed in three different records. Here, "record" means one of the records in the event database 30 or one of the source text descriptions 10. The number of themes extracted from a given event database 30 or set of source text descriptions 10 may number in the hundreds.

Once the automated antecedent theme extractor 40 has finished listing the antecedent candidates or text strings under the themes, it is desirable to eliminate any spurious and low-frequency themes. This can be done in several ways. A spurious theme will typically have only one antecedent candidate or text segment listed under it, while a low-frequency theme will typically have only a few antecedent candidates or text segments listed under it.

Therefore, the automated antecedent theme extractor 40 may eliminate spurious and low-frequency themes by discarding themes that have fewer than a minimum number of antecedent candidates or text segments listed under them. The minimum number of antecedent candidates or text segments may be variable. For example, if most of the themes have 20 or more antecedent candidates or text segments listed under then, the minimum number might be set at 10. Or if most of the themes have 5 to 10 antecedent candidates or text segments listed under them, the minimum number might be set at 2 or 3.

Alternatively, the automated antecedent theme extractor 40 may display the themes for review by an operator, who can eliminate spurious and low-frequency themes by designating themes to be discarded based on the number of antecedent candidates or text segments listed under them. The operator may also designate nonsensical themes and themes that are unlikely to helpful predicting a desired behavior to be discarded.

A hybrid method may also be employed in which the automated antecedent theme extractor 40 eliminates spurious and low-frequency themes, and then displays the remaining themes to an operator, who may designate nonsensical themes and themes that are unlikely to be helpful in predicting a desired behavior to be discarded. An operator may choose to describe the antecedent theme with a sentence that captures the common concept described by the pair-pair collections of statements, as guided by the first pair to aid in understanding. For example, the following sentence can describe the antecedent identified by the pair and its associated pair-pairs: The dog ran in the presence of a bouncing ball. By stating the antecedent in an easier to understand sentence, it is easier for an operator to determine the presence or absence of antecedents on any given day to present to the trained pattern classifier as a vector to achieve a prediction.

The automated antecedent theme extractor 40 then creates an antecedent data array (not shown in FIG. 1) having a number of rows equaling the number of behavior examples (i.e., the number of records in the event database 30 or the number of text segments), and a number of columns equaling the number of derived themes, and enters a "1" or a "0" in each element in the antecedent data array as described in the example below. Alternatively, the rows of the antecedent data array may represent the derived themes, and the columns of the antecedent data array may represent the behavior examples.

For the above example, the row in the antecedent data array for record 042006 receives a "0" in the 22nd column of the antecedent data array (corresponding to theme #22) because there is no antecedent candidate or text segment from that record listed under theme #22. The rows in the antecedent data array for records 042005, 041905, and 020104 all receive a "1" in the 22nd column of the antecedent data array (corresponding to theme #22) because an antecedent candidate or a text segment from each of these records is listed under theme #22. The antecedent data array then represents in binary form the presence and absence of all derived themes across all behavior examples.

The automated antecedent theme extractor 40 then creates an antecedent and outcome data array 50 by adding columns representing target behaviors to be predicted to the antecedent data array described above. For example, if the target behaviors to be predicted are that the oil industry will raise prices, keep prices the same, or drop prices, three output columns are added to the antecedent data array described above to obtain the antecedent and outcome data array 50. These three output columns contain a "1" or a "0" for each row. For example, row one might represent a behavior example identified by a unique identifier 040404 in which the oil industry raised prices. In this example, the three output columns would contain 1, 0, 0. These output columns represent the target behaviors to be predicted, which are the actual behaviors described in the behavior examples. It should be noted that any number of possible target behavior outcomes may be represented in this manner across all behavior examples.

The data in the output columns may be entered into the antecedent and outcome data array 50 by an operator, in which case the automated antecedent theme extractor 40 displays the antecedent and outcome data array 50 to the operator so the operator can enter the appropriate data.

Alternatively, if event database 30 is being used and it contains fields representing outcomes of the behaviors described in the records with a "1" or a "0", the automated antecedent theme extractor 40 may enter the "1"s or "0"s in the appropriate columns in the antecedent and outcome data array 50.

The automated antecedent theme extractor 40 is language-independent in its automatic extraction of predictive events and situations (i.e., precursor antecedents) from the text corpus consisting of all of the antecedent candidates in the event database 30 or all of the text segments obtained from the source text descriptions 10. This language independence occurs as a result of the automated antecedent theme extractor 40 creating themes based on high-frequency word pairings with no linguistic rules. That is, the automated theme extractor 40 can extract themes from a text corpus in any language since it does this by pairing words with words without regard to the actual meaning of the words.

The autoanalyzer 70 is fully automated and develops, configures, and optimizes the BPN (back-propagation neural network) pattern classifier 60, which receives as an input on a row-by-row basis the binary representations of the presence-absence of antecedent candidates and the binary representations of outcomes contained in the antecedent and outcome data array 50. However, the invention is not limited to the use of the BPN pattern classifier 60, and other types of pattern classifiers may be used, such as a discriminant analysis pattern classifier, a K-nearest neighbor pattern classifier, or any other type of pattern classifier using statistical pattern recognition. The autoanalyzer 70 configures the BPN pattern classifier 60 for training and testing with variables to be modified during optimization including, but not limited to, the number of elements in a hidden layer, an epoch, a method to stop training based on minimizing error, and the number of antecedents used as an input. Antecedents can be reduced in number by correlating the antecedents with the outcomes in the antecedent and outcome data array 50, and selecting only those antecedents that meet or exceed a specified correlation coefficient acceptance criterion. For example, if a criterion of 0.25 is specified, only those antecedents that meet or exceed the criterion of 0.25 when correlated with the outcomes are selected. By varying the criterion, the number of antecedents that are selected can be varied. A lower criterion results in more antecedents being selected, and a higher criterion results in fewer antecedents being selected. It should be noted that other methods of associating antecedents with outcomes other than correlation may be used (e.g., the number of times the antecedent is associated with the outcome with the historical data as represented in the data array as an acceptance criterion, the percentage of occurrence of antecedents to outcome, etc.).

In the BPN pattern classifier 60, a number of training examples equals the number of behavior examples, or records, in the event database 30, or the number of text segments obtained from the source text descriptions 10. A training set is defined as all cases except one case that is withheld for testing. Therefore, each training/testing set combination consists of a training set consisting of all cases minus one withheld case, and a testing set consisting of the one withheld case. This is known as a leaving-one-out (L−1) cross-validation methodology. The BPN pattern classifier 60 performs a training process by repeatedly processing the training/testing set combinations for a given configuration of the BPN pattern classifier 60 and adjusts weights assigned to the elements in the hidden layer until a minimum error is obtained for that particular configuration of the BPN pattern classifier 60.

Once a minimum error has been obtained for a specific configuration of the BPN pattern classifier 60, the autoanalyzer 70 calculates accuracy metrics of the BPN pattern classifier 60 as True Positive (TP), True Negative (TN), False Positive (FP), and False Negative (FN) determinations for the specific configuration of the BPN pattern classifier 60 and a set of antecedents meeting or exceeding a specific correlation coefficient criterion. The autoanalyzer 70 then modifies variables of the BPN pattern classifier 60 such as the epoch, the number of antecedents, the number of elements in the hidden layer, and/or a to stop training based on minimizing error to obtain a new configuration of the BPN pattern classifier 60, and the BPN pattern classifier 60 repeats the training process for the new configuration. This process continues until an optimally performing BPN pattern classifier defined as the BPN pattern classifier 60 having the highest true positive and true negative accuracy rates is achieved. The autoanalyzer 70 then outputs this optimally performing BPN classifier as the optimized BPN classifier 80.

Once the automated configuration, antecedent reduction, and cross-validation of multiple pattern classifiers have been performed and the classifier with the highest overall accuracy has been selected and output as the optimized BPN pattern classifier 80, prediction is accomplished by submitting to the optimized BPN pattern classifier 80 the current antecedent presence-absence vector 90 representing the current status of the antecedents selected for the optimized BPN pattern classifier 80 in the environment at the time the prediction is to be made to obtain the predictive result 90. The prediction is represented as the highest strength output among two or more target behavior outputs as generated by the optimized BPN pattern classifier 80 when presented with a new input vector. Likewise, by presenting different combinations of available antecedents as different vectors, outcomes under these different scenarios may be determined in either a single "what if" scenario, or multiple scenarios represented by different combinations of antecedents presented to the optimized BPN pattern classifier 80 in batch mode. The number of scenarios generated equal the number of antecedent combinations presented to the optimized BPN pattern classifier 80.

Figure 3:
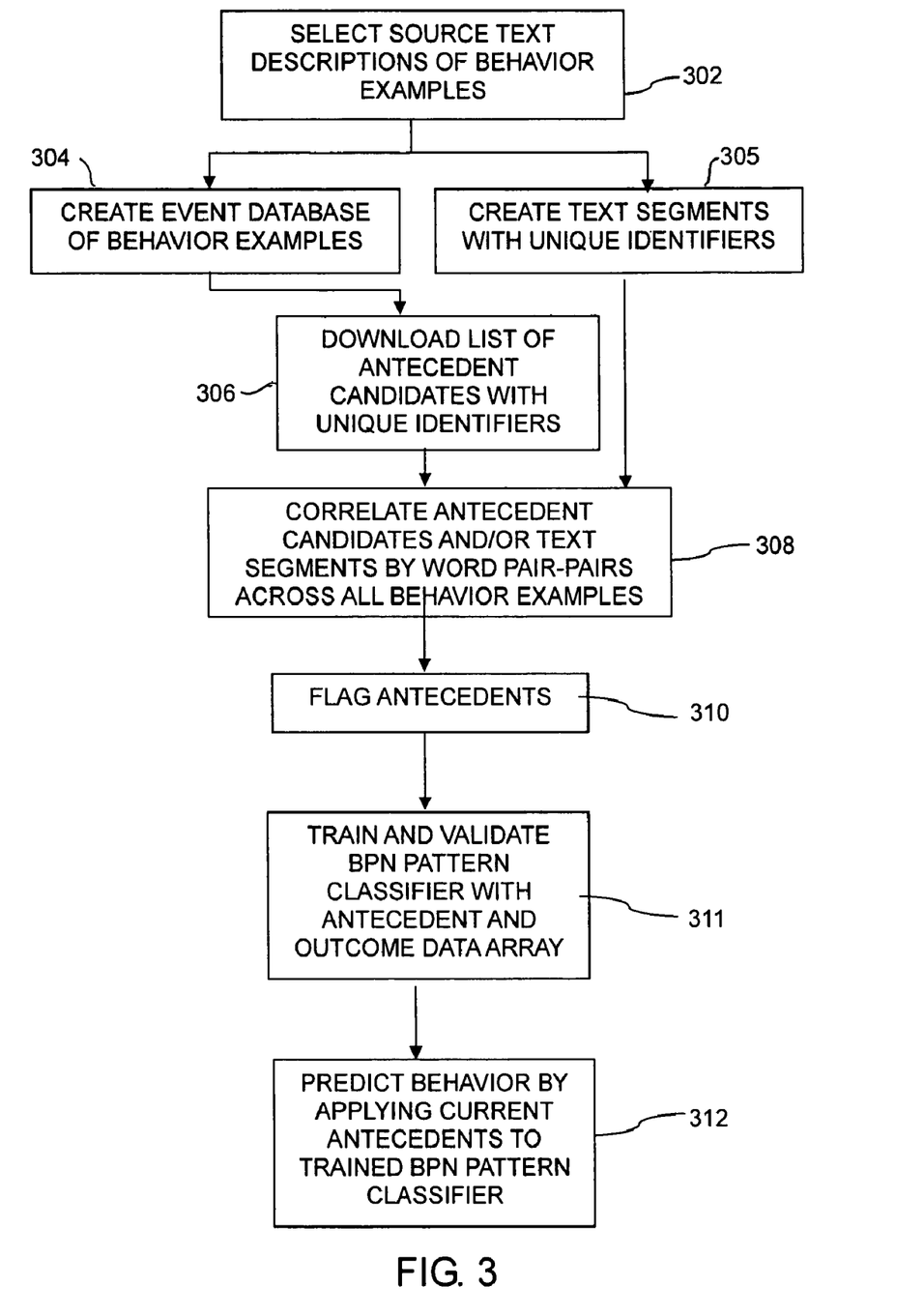
FIG. 3 shows a method of predicting behavior according to an embodiment of the invention.

FIG. 3 shows a method of behavior prediction according to an embodiment of the invention. Source text descriptions of behavior examples are selected (operation 302). An event database of behavior examples is created from the source text descriptions (operation 304) and/or text segments with unique identifiers are created from the source text descriptions (operation 305). A list of antecedent candidates with unique identifiers is downloaded from the event database (operation 306). The antecedent candidates and/or the text segments are correlated by word pair-pairs (operation 308) across all behavior examples. Antecedents are flagged (operation 310). A BPN pattern classifier is trained and validated with an antecedent and outcome data array generated based on the flagged antecedents (operation 311). Behavior is then predicted by applying current antecedents to an automatically selected, trained, and validated optimally performing (i.e., most accurate) BPN pattern classifier, i.e., an optimized BPN pattern classifier (operation 312).

Figure 4A:
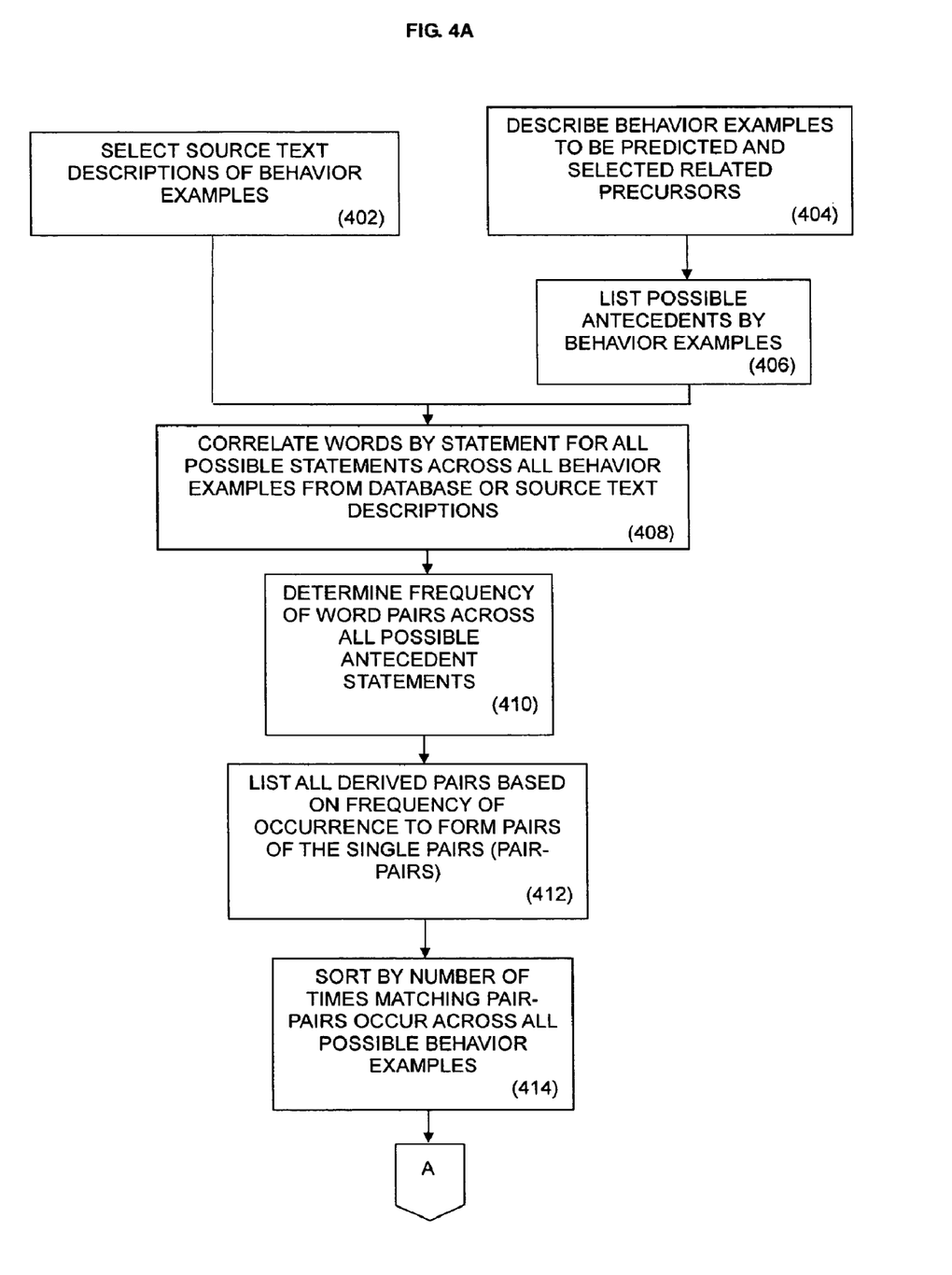
FIGS. 4A-4B shows a method of predicting behavior according to another embodiment of the invention.
Figure 4B:
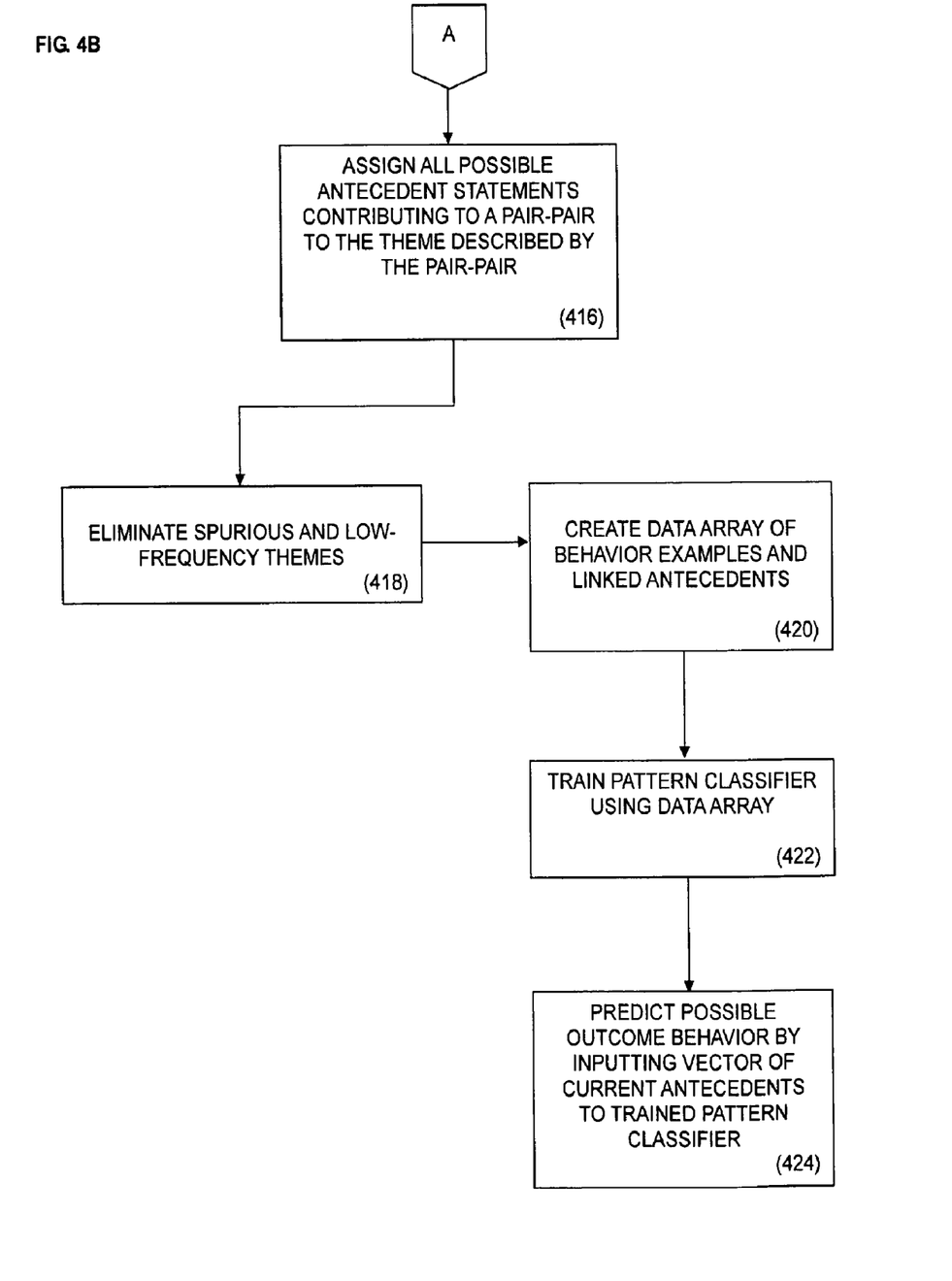

FIGS. 4A-4B show a method of behavior prediction according to another embodiment of the invention. Source text descriptions of behavior examples are selected (operation 402) and/or behavior examples to be predicted and selected related precursors are described (operation 404) and possible antecedents are listed by behavior example (operation 406). Words are correlated by statement for all possible statements across all behavior examples from database or source text descriptions (operation 408). A frequency of word pairs across all possible antecedent statements is determined (operation 410). All derived pairs are listed based on a frequency of occurrence to form pairs of the single pairs (pair-pairs) (operation 412). Matching pair-pairs are sorted by the number of times they occur across all possible behavior examples (operation 414).

All possible antecedent statements contributing to a pair-pair are assigned to the theme (antecedent) describing that pair-pair (operation 416). Spurious and low-frequency themes are eliminated (operation 418). A data array of behavior examples and linked antecedents is created (operation 420). A pattern classifier is trained using the data array (operation 422). Possible outcome behavior is determined as presence or absence columns by behavior example and added to the data array. Once this data array has been submitted to the automated antecedent reduction and optimized pattern classifier construction and validation for optimal performance, the best performing pattern classifier (i.e., the optimized BPN pattern classifier) is presented with a vector of antecedents selected for the optimized BPN pattern classifier in the form of binary data indicating whether any given antecedent is present or absent. The immediate result is the predicted outcome as designated by the highest outcome result of all outcomes (operation 424).

The invention can also be embodied as computer-readable code on a computer-readable recording medium capable of execution by a computer. The computer-readable recording medium may be any data storage device that can store data that can be thereafter read by a computer. Examples of a computer-readable recording medium include read-only memory (ROM), random-access memory (RAM), CD-ROMs, magnetic tapes, floppy disks, optical data storage devices, and carrier waves (such as data transmission through the Internet). The computer-readable recording medium may also be distributed over network-coupled computer systems so that the computer-readable code is stored and executed in a distributed fashion. Also, functional programs, code, and code segments for implementing the invention can be easily written by programmers skilled in the art to which the invention pertains.

Although several embodiments of the invention have been shown and described, it would be appreciated by those skilled in the art that changes may be made in these embodiments without departing from the principles and spirit of the invention, the scope of which is defined in the claims and their equivalents.

What is claimed is:

1. A non-transitory computer-readable medium comprising computer-executable instructions for behavior prediction, the computer-executable instructions comprising:
   a formatter that splits source text descriptions describing behavior examples, and associated antecedent candidates into text segments and tags the text segments with unique identifiers identifying the source text descriptions from which the text segments were obtained;
   an automated antecedent theme extractor that:
      creates antecedents by cross-correlating words contained in the text segments to create a list of word pairs and cross-correlating each of the word pairs to one or more other word pairs in the list to create pair-pairs, such that the antecedents comprise a word pair from the list of word pairs, pair-pairs corresponding to the word pair, and any text segment containing the word pair;
      eliminates antecedents that have fewer than a minimum number of text segments listed thereunder, and
      generates an antecedent and outcome data array containing rows corresponding to the text segments, columns corresponding to the antecedents and containing data indicating whether or not the antecedents are present in the text segments, and columns corresponding to outcomes and containing data indicating whether or not the outcomes are present in the text segments; and
   a pattern classifier that receives the antecedent and outcome data array as a training input and outputs a training output in response to the data for each text segment included in the antecedent and outcome data array, and receives as a prediction input a current antecedent presence-absence vector indicating a presence or absence of the antecedents included in the antecedent and outcome data array in a current environment and outputs a prediction of a new occurrence of a target behavior in response to the current antecedent presence-absence vector.

2. The non-transitory computer-readable medium of claim 1, wherein the computer-executable instructions further comprise a validation unit that analyzes an accuracy of the training output from the pattern classifier and trains the pattern classifier to improve an accuracy of the training output until a minimum training error is achieved.

3. The non-transitory computer-readable medium of claim 2, wherein the validation unit trains the pattern classifier before the pattern classifier receives the current antecedent presence-absence vector as a prediction input.

4. The non-transitory computer-readable medium of claim 2, wherein the validation unit trains the pattern classifier using a leaving-one-out cross-validation methodology.

5. The non-transitory computer-readable medium of claim 1, wherein the pattern classifier is a BPN (back-propagation neural network) pattern classifier.

6. The non-transitory computer-readable medium of claim 1, wherein the automated antecedent theme extractor processes the text segments in a language-independent manner.

7. A computer-implemented method of behavior prediction, comprising:
   downloading from a database of behavior examples a list of antecedent candidates associated with the behavior examples with unique identifiers identifying the behavior examples;
   processing the list of antecedent candidates with the unique identifiers with an automated antecedent theme extractor that:
      creates antecedents by cross-correlating words contained in the antecedent candidates to create a list of word pairs and cross-correlating each of the word pairs to one or more other word pairs in the list to create pair-pairs, such that the antecedents comprise a word pair from the list of word pairs, pair-pairs corresponding to the word pair, and any antecedent candidate containing the word pair;
      eliminates antecedents that have fewer than a minimum number of antecedent candidates listed thereunder, and
   generating an antecedent and outcome data array containing rows corresponding to the behavior examples, columns corresponding to the antecedents and containing data indicating whether or not the antecedents are present in the behavior examples, and columns corresponding to outcomes and containing data indicating whether or not the outcomes are present in the text segments;
   processing the antecedent and outcome data array as a training input with a pattern classifier that outputs a training output in response to the data for each behavior example included in the antecedent and outcome data array;
   analyzing an accuracy of the training output from the pattern classifier with a validation unit that trains the pattern classifier to improve an accuracy of the training output until a minimum training error is achieved; and
   processing a current antecedent presence-absence vector indicating a presence or absence of the antecedents included in the antecedent and outcome data array in a current environment as a prediction input with the pattern classifier trained by the validation unit that outputs a prediction of a new occurrence of a target behavior in response to the current antecedent presence-absence vector.

8. The computer-implemented method of claim 7, wherein the validation unit trains the pattern classifier using a leaving-one-out cross-validation methodology.

9. The behavior predictor of claim 7, wherein the pattern classifier is a BPN (back-propagation neural network) pattern classifier.

10. The behavior predictor of claim 7, wherein automated antecedent theme extractor processes the list of the antecedent candidates with the unique identifiers in a language-independent manner.

* * * * *